(12) United States Patent
Kato et al.

(10) Patent No.: US 6,202,283 B1
(45) Date of Patent: Mar. 20, 2001

(54) METHOD OF MANUFACTURING A SHAFT WITH SURFACES THEREOF MODIFIED

(75) Inventors: Keigo Kato; Masataka Mizuno, both of Aichi (JP)

(73) Assignee: Aoyama Seisakusho Co., Ltd., Nagoya (JP)

( * ) Notice: Subject to any disclaimer, the term of this patent is extended or adjusted under 35 U.S.C. 154(b) by 0 days.

(21) Appl. No.: 09/308,918

(22) PCT Filed: Oct. 15, 1998

(86) PCT No.: PCT/JP98/04651
§ 371 Date: May 26, 1999
§ 102(e) Date: May 26, 1999

(87) PCT Pub. No.: WO99/20412
PCT Pub. Date: Apr. 29, 1999

(30) Foreign Application Priority Data

Oct. 17, 1997 (JP) .................................... 9-285356

(51) Int. Cl.$^7$ .............................. B21D 39/00; B23P 11/00
(52) U.S. Cl. ................................. 29/505; 29/509
(58) Field of Search ........................... 29/893.31, 456, 29/505, 515, 240.5, 509

(56) References Cited

U.S. PATENT DOCUMENTS

| | | | |
|---|---|---|---|
| 3,071,022 | * | 1/1963 | Strandgren .............................. 74/458 |
| 3,433,892 | * | 3/1969 | Elbindari ................................ 174/126 |
| 3,461,470 | * | 8/1969 | Cochrum .................................. 10/10 |
| 3,602,975 | * | 9/1971 | Thurston ............................... 29/240.5 |
| 4,368,552 | * | 1/1983 | Sugiyama .............................. 10/10 R |
| 4,527,978 | | 7/1985 | Zackrisson . |
| 4,584,247 | * | 4/1986 | Mulholland ............................. 72/103 |
| 4,724,694 | * | 2/1988 | Medal .................................... 72/88 |
| 5,636,549 | * | 6/1997 | Devenyi ............................... 74/89.15 |

FOREIGN PATENT DOCUMENTS

| | | | |
|---|---|---|---|
| 62-62014 | 3/1987 | (JP) . | |
| 62-194017 | 8/1987 | (JP) . | |
| 2-77621 U | 6/1990 | (JP) . | |
| 4-56163 | 9/1992 | (JP) . | |
| 277776 * | 4/1994 | (JP) | ..................................... 140/111 |
| 8-285030 | 11/1996 | (JP) . | |
| 1389977 * | 4/1988 | (SU) | ....................................... 29/505 |

* cited by examiner

*Primary Examiner*—S. Thomas Hughes
*Assistant Examiner*—Jermie E. Cozart
(74) *Attorney, Agent, or Firm*—Frishauf, Holtz, Goodman, Langer & Chick, P.C.

(57) ABSTRACT

A method of manufacturing a shaft having modified surfaces. The method comprises forming thread grooves on surfaces of a cylindrical-shaped base material for a shaft, continuously winding a length of wire in and along the thread grooves, and compressing a peripheral surface of the base material for the shaft with the length of wire wound and received in the thread grooves, in a direction of diameter reduction to perform plastic deformation of crests of thread ridges between the adjacent thread grooves or the crests and the wire to have the length of wire being fixed to and united with the base material for the shaft. The method improves the hardness of surfaces of a base material for a shaft in a relatively simple manner, and transforms properties of surfaces of the base material for a shaft to make the base material for the shaft applicable to other uses.

20 Claims, 2 Drawing Sheets

(A)

(B)

(C)

(D)

METHOD OF MANUFACTURING A SHAFT WITH SURFACES THEREOF MODIFIED

TECHNICAL FIELD

The present invention relates to a method of manufacturing a shaft with surfaces thereof modified, and more particularly to a method of manufacturing a shaft having a wire, which is formed of a different material from that of the shaft, fixed to and united with regions below the surface of the shaft.

BACKGROUND ART

A technology for preventing damage or abrasion on surfaces of a metallic material is classified roughly into the surface transformation method and the surface coating method.

The former technology includes a method of forming an alloy layer on surfaces, such as the cementation method, the nitriding method, the metallic cementation and the like, or quench hardening by heating, a method making use of residual stress, or the shot peening method. These methods involve complicated and large apparatuses therefor, and are inapplicable or difficult to be applicable to a base material for a shaft, which is composed of a soft metal such as aluminum or the like.

In contrast, the latter technology includes a metal plating method typified by hard chromium plating, the metalizing method, the ceramic coating method, which uses ceramics such as cermet, but involves a disadvantage in poor durability due to a difficult point in its bonding strength for a base material for the shaft, which is composed of a soft material such as aluminum or the like, as well as relatively low productivity.

Also, as a surface treatment method for an aluminum alloy, a method is known which comprises applying the electrochemical treatment (anodic oxidation method) on surfaces of the alloy to form a protective film composed of aluminum oxides and having a thickness of several to several tens microns to enhance its surface hardness. However, such protective film is small in thickness to be liable to wear, and has less chemical resistance to be liable particularly to erosion by alkali. In addition, there is caused a problem in cost because it takes considerable time to form such protective film.

Further, the above-mentioned various methods apply to metals as the base material, and are not very applicable to synthetic resin materials.

SUMMARY OF INVENTION

The present invention solves the problems of the prior art, and has as its object to provide a method of manufacturing a shaft with surfaces thereof modified; the method serving to improve the hardness of surfaces of a base material for a shaft in a relatively simple manner, and transforming properties of surfaces of the base material for a shaft to make the base material for a shaft applicable to other uses.

The present invention provides a method of manufacturing a shaft with surfaces thereof modified, comprising the steps of: forming a thread groove on surfaces of a cylindrical-shaped base material for a shaft; continuously winding a length of wire in and along the thread groove; and followed by compressing a peripheral surface of the base material for the shaft with the length of wire wound and received in the thread groove, in a direction of diameter reduction to perform plastic deformation of crests of thread ridges between the adjacent thread grooves or the crests and the wire to have the length of wire fixed to and united with the base material for the shaft.

Preferably, a rolling method is used to form the thread groove and to have the length of wire fixed to and united with the base materials for the shaft.

In addition, a preferable combination of materials in practicing the invention can include:

(1) A. base material for a shaft: aluminum or aluminum alloy

B. wire: metallic wire having a greater hardness than that of the base material for a shaft (2) A. base material for a shaft: structural plastics B. wire: metallic wire having a good conductivity Of course, other combinations than the above ones are possible in practicing the invention. The reason for this is that optimum combinations change depending upon the use of the shafts.

BEST MODE FOR CARRYING OUT THE INVENTION

The invention will be described in detail with reference to the drawings, in which an embodiment of the invention is shown.

FIGS. 1(A), 1(B), 1(C) and 1(D) illustrate respective steps of the invention in terms of changes in the external shape of a base material for a shaft which is a member being worked. Further, it should be noted that a size of the base material for the shaft, which is a member being worked, is not an actual size because an understanding of the processing steps is preferential.

Figure 1:
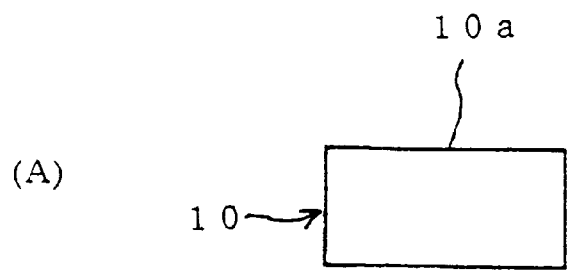
FIGS. 1(A), 1(B), 1(C) and 1(D) are elevational views which illustrate respective steps of the invention, in each of which a base material for a shaft is processed to change the external shape thereof.
Figure 1:
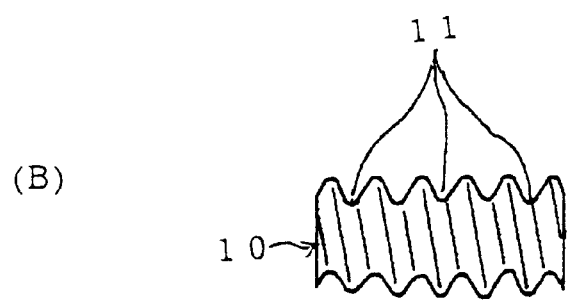
Figure 1:
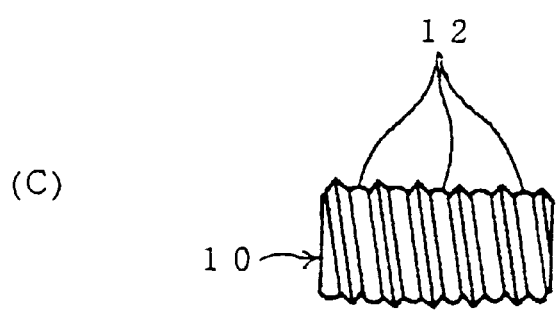
Figure 1:
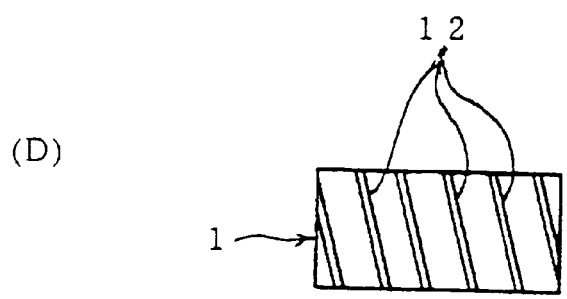

FIG. 1(A) shows a cylindrical-shaped base material for a shaft prior to processing. FIG. 1(B) shows the base material for a shaft going through a step (hereinafter, referred to as the "thread groove forming step"), in which a thread groove is formed on surfaces of the base material for the shaft. FIG. 1(C) shows the base material for the shaft going through a step (hereinafter, referred to as the "wire applying step"), in which a length of wire is wound along the thread groove. FIG. 1(D) shows the base material for the shaft going through a step (hereinafter, referred to as the "wire fixing step"), in which surfaces of the base material for the shaft are compressed to have the length of wire fixed to and united with the base material for the shaft.

First, a columnar-shaped base material for the shaft (10) having a substantially smooth surface (10a) is prepared. Here the base material for the shaft is prepared by cutting a coiled wire rod to a desired length or cold pressing a metallic material into a columnar-shaped shaft having a smooth surface.

Subsequently, the base material for the shaft thus prepared is made to undergo the "thread groove forming step". In this step, a thread groove (11) is spirally formed on a surface of the base material for the shaft. While a rolling method is preferable in terms of work efficiency as a method of forming the thread groove, other threading methods may be employed, of course. In addition, the thread groove is U-shaped in principle taking into account its matching with a configuration of a wire wound and received therein, but may be substantially V-shaped like conventional threads as the case may be. Also, because the wire (12) in the subsequent step is wound and received in the thread groove without slacking, a width (W) of the thread groove is made to be somewhat greater than a diameter [d] of the wire, and a depth [D] of the thread groove is made to assume 1.2 to 1.8, particularly preferably 1.4 to 1.6 in terms of D/d. A pitch [p] of the thread groove may be appropriately selected taking into account a force, by which the wire is held on the shaft, and a desired abrasion resistance of the shaft surfaces in accordance with use of and size of the shaft and materials for the shaft and wire.

Figure 3:
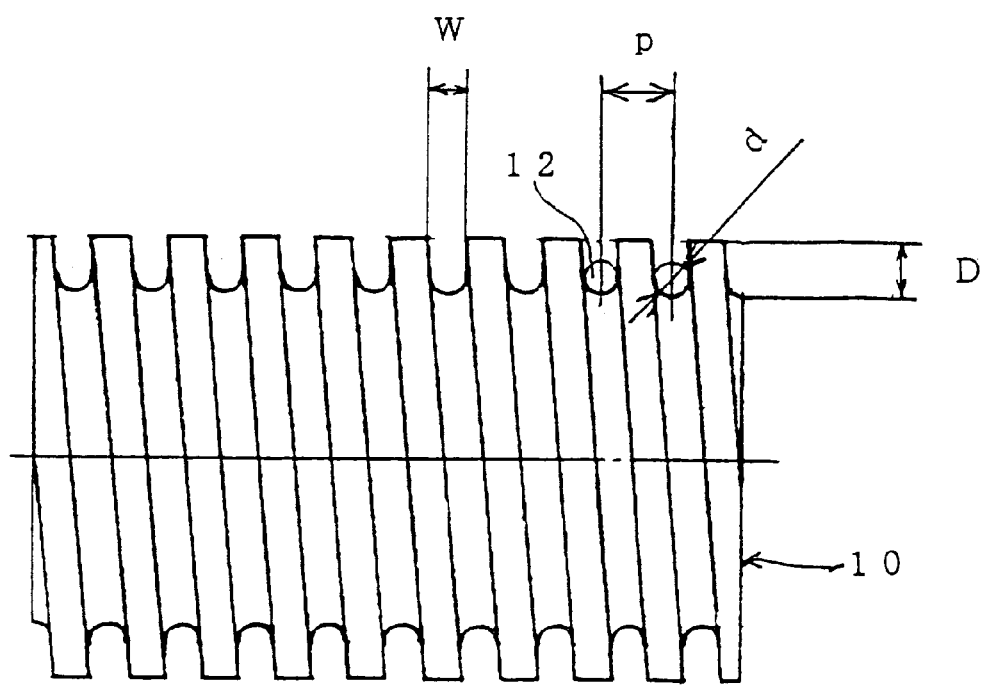
FIG. 3 is an enlarged, cross sectional view of an essential portion illustrating an engaging relationship between thread grooves and a wire in the "thread groove forming step" in the invention.

An example of these data is given below (see FIG. 3). In addition, a material for the shaft is A 2017, and a material for the wire is copper wire.
(1) Depth [D] of the thread groove: 1.35 mm
(2) Width [W] of the thread groove: 1.0 mm
(3) Pitch [p] of the thread groove: 2.0 mm
(4) Diameter [d] of the wire: 0.9 mm
(5) Outer diameter of the base material for the shaft: 11.7 mm Then the base material for the shaft, of which surface is formed with the thread groove, is made to undergo the "wire applying step". Here the wire (12) is wound and received in the thread groove (11). A way of practicing such step may be manually carried out on the base material for the shaft, which is fixed by a fixing device such as a vice or the like and of which surface is formed with a thread groove, while exerting a predetermined pulling force on one end of the wire, the other end of which is secured to a starting end of the thread groove by means of some measures, and exertion of the pulling force on the one end of the wire may be carried out by means of a tool and a machine. Whether either measures may be employed, it is important to wind the wire in the thread groove without slacking.

Figure 2:
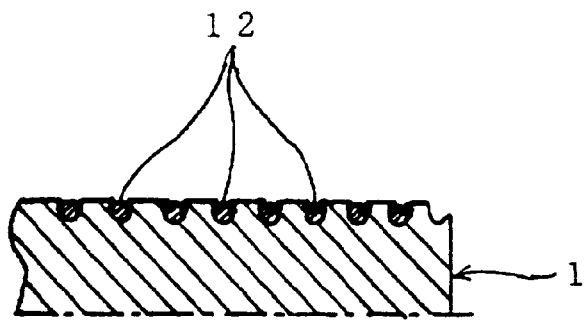
FIG. 2 is a cross sectional view of an essential portion of a shaft, which is finally obtained in the invention, and of which surfaces are modified.

Finally, the base material for the shaft with the wire applied in the thread groove is made to undergo the "wire fixing step". Here crests of thread ridges between the adjacent thread grooves (in the case where a diameter of the wire (12) wound and received in the thread groove is smaller than a depth of the thread groove) or the crests and the wire (in the case where a diameter of the wire is larger than a depth of the thread groove) are compressed toward a center of the base material for the shaft. Concretely, the wire fixing step is carried out by interposing the base material for the shaft having undergone the "wire applying step" between a stationary die and a movable die with an axis of the base material for the shaft made in parallel to facing surfaces of the both dies, and rolling the movable die over the stationary die while pressing the movable die against the stationary die. As a result, the thread ridges and the wire are subjected to plastic deformation, so that the wire is embedded spirally in the vicinity of the surfaces of the base material for the shaft to be fixed thereto. In the case where an object being compressed consists of only the crests of the thread ridges (see FIG. 3), the wire is made to be embedded completely below the surfaces of the base material for the shaft. In contrast, in the case where an object being compressed consists of both the crests of the thread ridges and the wire, a portion of the wire is made to be substantially flush with the crests of the thread ridges (a state shown in FIG. 2). Whether either of the states should be selected may be appropriately determined depending upon that purpose, for which the base material for the shaft with the wire fixed thereto is used. Of course, the dies must be used which are formed of a material, such as SKD11 (alloy tool steels-cold metallic mold, having a greater hardness than that of the base material for the shaft.

With the shaft (1) manufactured in the above manner, a major part of the wire (12) or the entire wire in some cases is spirally embedded and fixed at equal pitch, so that the wire is prevented from simply separating or falling off whereby the surface modifying effect can be preserved over a long term.

Incidentally, the respective steps described above are the minimum steps required for practicing the invention, and don't exclude appropriate addition of necessary steps such as the wire cleaning treatment, surface treatment and other steps at necessary points of time.

In this manner, the shaft (1) provided according to the invention can be preferably used in, for example, valve discs for slide valves and needle valves, wear resisting machine parts such as various sliding shaft bodies or their base materials.

A combination of the base material for the shaft (10) and the wire (12) in use for such wear resisting machine parts or their base materials is preferable in terms of durability when using a metallic shaft of aluminum or aluminum alloy, which is good in workability as the base material for the shaft, and a metallic wire, for example, stainless steel, spring copper alloy and the like, which is high in hardness and stainless.

The invention can be applied to other purposes than the above-mentioned improvement of surface hardness of the shaft (1). For example, if structural plastics such as polyacetal resin, polyamide resin and the like is used for the base material for the shaft and a wire rod material, such as copper or a copper alloy, having a good electrical conductivity is used for the wire, the electricity charge heating effect of the wire thus fixed can be used in addition to modification of the surface hardness of the shaft. Because the shaft obtained in this manner includes an electric conductor uniformly distributed in the vicinity of the surface thereof, the entire shaft can be uniformly heated, and thus is made applicable as shafts intended for special uses, for example, heating apparatuses, parts for freeze proofing and the like by separately providing for a heat regulating mechanism such as a thermostat and the like.

In addition, in use with the prime object on the electricity charging effect of the wire, it goes without saying that, since the use of structural plastics for the base material for the shaft is based on the usefulness of lightweight and insulating substances, a material for the base material for the shaft is not limited to structural plastics.

Industrial Applicability

As described above, according to the invention, the wire applied to the surface of the base material for the shaft will not simply separate or fall off, and the wire is uniformly distributed in the vicinity of the surface of the base material for the shaft, so that wear resisting machine parts or base materials therefor, which are excellent in durability, can be presented at low cost.

Also, shafts, such as heating bodies, having new avenues of use, which have not been existent heretofore, can be provided by forming the wire from a material which is excellent in electric conductivity.

Accordingly, the invention is of exceedingly great industrial value in providing a method of manufacturing a shaft with surfaces thereof being modified, by which method problems of the prior art are solved, and furthermore in providing a method of manufacturing a shaft having new avenues of use.

What is claimed is:

1. A method of manufacturing a shaft having modified surfaces, comprising:

forming a plurality of thread grooves with respective crests of thread ridges on an outer surface of a cylindrical-shaped base material for a shaft;

continuously winding a length of wire in and along the thread grooves; and compressing a peripheral surface of the base material for the shaft with the length of wire wound and received in the thread grooves by a rolling method, in a direction of diameter reduction to perform plastic deformation of the crests of the thread ridges between two adjacent thread grooves or the crests and the wire such that the length of wire is fixed to and united with the base material for the shaft to form a fixed and united wire whose outer surface is substantially flush with the surface of the shaft.

2. The method according to claim 1, wherein a rolling method is used to form said thread groove.

3. The method according to claim 2, wherein said base material for the shaft comprises aluminum or an aluminum alloy; and said wire comprises a metallic wire having a greater hardness than that of the base material for the shaft.

4. The method according to claim 2, wherein said base material for the shaft comprises a structural plastic; and said wire comprises a metallic wire having a good electrical conductivity.

5. The method according to claim 1, wherein said base material for the shaft comprises aluminum or an aluminum alloy; and said wire comprises a metallic wire having a greater hardness than that of the base material for the shaft.

6. The method according to claim 1, wherein said base material for the shaft comprises a structural plastic; and said wire comprises a metallic wire having a good electrical conductivity.

7. The method according to claim 6, wherein the structural plastic is selected from the group consisting of a polyacetal resin and a polyamide resin.

8. The method according to claim 1, wherein the thread grooves are U-shaped or V-shaped.

9. The method according to claim 8, wherein the thread grooves have a width that is greater than the diameter of the wire; and a ratio of the depth of the thread grooves to the diameter of the wire is 1.2 to 1.8.

10. The method according to claim 9, wherein the ratio of the depth of the thread grooves to the diameter of the wire is 1.4 to 1.6.

11. The method according to claim 10, wherein the wire is made of stainless steel or a spring copper alloy.

12. A method of manufacturing a shaft having modified surfaces comprising:

forming a plurality of thread grooves with respective crests of thread ridges on an outer surface of a cylindrical-shaped base material for a shaft;

continuously winding a length of wire in and along the thread grooves; and compressing a peripheral surface of the base material for the shaft with the length of wire wound and received in the thread grooves by a rolling method, in a direction of diameter reduction to perform plastic deformation of the crests of the thread ridges between two adjacent thread grooves or the crests and the wire such that the length of wire is fixed to and united with the base material for the shaft to form a fixed and united wire whose outer surface is substantially flush with the surface of the shaft, and so that the wire is completely spirally embedded in the vicinity of the surface of the base material for the shaft.

13. The method according to claim 12, wherein a rolling method is used to form said thread grooves.

14. The method according to claim 13, wherein said base material for the shaft comprises aluminum or an aluminum alloy; and said wire comprises a metallic wire having a greater hardness than that of the base material for the shaft.

15. The method according to claim 13, wherein said base material for the shaft comprises a structural plastic; and said wire comprises a metallic wire having a good electrical conductivity.

16. The method according to claim 12, wherein said base material for the shaft comprises aluminum or an aluminum alloy; and said wire comprises a metallic wire having a greater hardness than that of the base material for the shaft.

17. The method according to claim 12, wherein said base material for the shaft comprises a structural plastic; and said wire comprises a metallic wire having a good electrical conductivity.

18. The method according to claim 12, wherein the thread grooves are U-shaped or V-shaped.

19. The method according to claim 18, wherein the thread grooves have a width that is greater than the diameter of the wire; and a ratio of the depth of the thread grooves to the diameter of the wire is 1.2 to 1.8.

20. The method according to claim 19, wherein the ratio of the depth of the thread grooves to the diameter of the wire is 1.4 to 1.6; and the wire is made of stainless steel or a spring copper alloy.

* * * * *